(12) United States Patent
Khan et al.

(10) Patent No.: US 11,976,009 B1
(45) Date of Patent: May 7, 2024

(54) THREE COMPONENTS KIT FOR HIGH PERFORMANCE GREEN CONCRETE

(71) Applicant: KING FAISAL UNIVERSITY, Al Hasa (SA)

(72) Inventors: Kaffayatullah Khan, Al Hasa (SA); Muhammad Nasir Amin, Al Hasa (SA); Abdullah Mohammed Alqahtani, Al Hasa (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

(21) Appl. No.: 18/537,742

(22) Filed: Dec. 12, 2023

(51) Int. Cl.
| | |
|---|---|
| C04B 28/04 | (2006.01) |
| C04B 7/02 | (2006.01) |
| C04B 7/28 | (2006.01) |
| C04B 14/06 | (2006.01) |
| C04B 24/26 | (2006.01) |
| C04B 28/02 | (2006.01) |
| C04B 103/32 | (2006.01) |
| C04B 103/61 | (2006.01) |

(52) U.S. Cl.
CPC .......... C04B 28/04 (2013.01); C04B 7/02 (2013.01); C04B 7/28 (2013.01); C04B 14/068 (2013.01); C04B 24/2664 (2013.01); C04B 28/021 (2013.01); C04B 2103/32 (2013.01); C04B 2103/61 (2013.01); C04B 2201/52 (2013.01)

(58) Field of Classification Search
CPC .. C04B 28/04; C04B 7/02; C04B 7/28; C04B 14/068; C04B 24/2664; C04B 28/021; C04B 2103/32; C04B 2103/61; C04B 2201/52
See application file for complete search history.

(56) References Cited

FOREIGN PATENT DOCUMENTS

JP   2004224631 A  *  8/2004  ............ C04B 28/02
WO  WO-2018156380 A1 *  8/2018  ............ C04B 14/14

OTHER PUBLICATIONS

Nauman Khurram et al., "Effect of Elevated Temperatures on Mortar with Naturally Occurring Volcanic Ash and Its Blend with Electric Arc Furnace Slag", Advances in Materials Science and Engineering, vol. 2018, pp. 1-11, First available online on Apr. 23, 2018.
Mohamed H. Mussa et al., "Fire Resistance of High-Volume Fly Ash RC Slab Inclusion with Nano-Silica", Materials (Basel), 14(12):3311, pp. 1-13, First available online on Jun. 15, 2021.
Abid Nadeem et al., "Mechanical performance, durability, qualitative and quantitative analysis of microstructure of fly ash and Metakaolin mortar at elevated temperatures", Construction and Building Materials, 38(2013), pp. 338-347, First available online on Sep. 29, 2012.
A.Kaur et al., "Use of Metakaolin as Pozzolanic Material and Partial Replacement with Cement in Concrete (M30)", Asian Review of Mechanical Engineering, 5(1), pp. 9-13, First available online on May 5, 2016.
Pengkun Hou et al., "Effects of Colloidal Nanosilica on Rheological and Mechanical Properties of Fly Ash-Cement Mortar", Cement & Concrete Composites, 35(2013), pp. 12-22, First available online on Sep. 11, 2012.
Kang Gao et al., "Effects SiO2/Na2O molar ratio on mechanical properties and the microstructure of nano-SiO2 metakaolin-based geopolymers", Construction and Building Materials, 53(2015), pp. 503-510, First available online on Jan. 4, 2014.
Kaffayatullah Khan et al., "Effect of Fineness of Basaltic Volcanic Ash on Pozzolanic Reactivity, ASR Expansion and Drying Shrinkage of Blended Cement Mortars", Materials 2019, 12, 2603, pp. 1-21, First available online on Aug. 15, 2019.

* cited by examiner

Primary Examiner — Anthony J Green
(74) Attorney, Agent, or Firm — Nath, Goldberg & Meyer; Richard C. Litman

(57) ABSTRACT

A green concrete composition comprising: a binder component comprising Portland cement, natural basaltic volcanic ash pozzolan, and colloidal nano-sized silica particles; an aggregate component comprising fine aggregates and coarse aggregates; water; and a super plasticizer.

19 Claims, 3 Drawing Sheets

THREE COMPONENTS KIT FOR HIGH PERFORMANCE GREEN CONCRETE

FIELD AND BACKGROUND

The disclosure of the present application relates to the composition of green concrete with Portland cement (C), natural basaltic volcanic ash pozzolan (VA), and colloidal nano-sized silica particles (CNS).

DESCRIPTION OF THE PRIOR ART

Concrete is the most widely used building material in the world and the second most consumed material on the planet, after water. Global concrete consumption is estimated to be nearly twice that of all other building materials. The broad use of concrete stems from its strength, durability, effortless molding capability, water resistance, fire resistance, wind resistance, zero maintenance, soundproofing properties, cost-effectiveness, and versatility. Concrete use is set to rise as global urbanization and economic development increases demand for new buildings and infrastructures.

However, the production of Portland cement, an essential constituent of concrete, leads to the release of significant amount of carbon dioxide and other greenhouse gases into the atmosphere which contributes to global warming. It is estimated that about 8% of global carbon dioxide emission comes from cement production.

Carbon dioxide is emitted from both the calcination process and the heating of cement kiln. During calcination, calcium carbonate and clay are heated in a kiln to form quicklime. The formed quicklime fuses with minerals in the clay and cools down into clinker. Then the clinker is grounded to make cement powder. During the process of forming quicklime, carbon dioxide is emitted as a byproduct. The source of heat during calcination is typically from a coal or natural gas fired furnace, which releases massive amounts of carbon dioxide into the atmosphere.

In order to reduce the carbon dioxide emission associated with the manufacturing of Portland cement, researchers have suggested multiple techniques such as carbon capturing and utilization, clinker reduction, alternate fuel sources, and modifications in cement manufacturing. It has been suggested that using alternate materials that have pozzolanic properties or supplementary cementitious materials (SCM) as a replacement of clinker is the most effective way to reduce carbon dioxide emission.

Besides the reduction of carbon footprint, it is imperative that the replacement of clinker with pozzolanic materials or supplementary cementitious materials does not degrade the properties of the concrete, such as compressive strength and durability. In the context of the latter, there are several tests to determine durability of a concrete. Rapid chloride penetration (permeability) test and water absorption test are examples of test methods for determining a concrete's durability.

Rapid chloride penetration is a test performed to determine the depth to which chloride ions from the environment penetrate into the concrete. A high rapid chloride penetration value may lead to corrosion in the concrete and a subsequent reduction in strength, serviceability, and aesthetics of the structure. On the other hand, water absorption is a test performed to determine the susceptibility of an unsaturated concrete to the penetration of water. It measures the rate of absorption of water and other liquids into unsaturated concrete through capillary suction. Concretes with high water absorption value are more susceptible to durability-related damage and performance degradation.

Thus, an environmentally friendly method for producing green concrete with the desirable properties is needed.

SUMMARY

The present subject matter relates to green concrete with Portland cement (C), natural basaltic volcanic ash pozzolan (VA), and colloidal nano-sized silica particles (CNS) to improve compressive strength and durability performance after aging.

In one embodiment, the green concrete as described herein can be prepared by a method of producing green concrete includes homogenously dispersing colloidal nano-sized silica particles (CNS) in water (W) via sonication to obtain a homogenous solution; obtaining a blended mixture of Portland cement (C), natural basaltic volcanic ash pozzolan (VA), and water (W); continuously mixing the blended mixture while adding the homogeneous solution to the blended mixture to obtain a blended mixture solution; continue mixing the blended mixture solution for about five minutes to obtain a homogeneous mixture; dividing the homogeneous mixture to obtain a first homogenous mixture and a second homogenous mixture; providing two molds; casting a layer of the first homogenous mixture in each of the two molds; releasing trapped air from each of the layers of the first homogenous mixture in the respective molds; compacting each of the layers of the first homogenous mixture using the respective molds to obtain compacted first homogeneous mixture layers; storing the compacted first homogeneous mixture layers in the respective molds for a duration of time; demolding the stored compacted first homogeneous mixture layers from the respective molds; and curing the demolded compacted first homogeneous mixture layers to obtain green concrete.

In another embodiment, the present subject matter relates to a green concrete composition comprising: a binder component comprising Portland cement (C), natural basaltic volcanic ash pozzolan (VA), and colloidal nano-sized silica particles (CNS); an aggregate component comprising fine aggregates and coarse aggregates; water; and a super plasticizer.

In one embodiment, each 1 m$^3$ of green concrete can comprise about 533 kg of the binder component, 1732 kg of the aggregate component, 160 kg of the water, and 6.7-8 kg of the super plasticizer.

In another embodiment, each 1 m$^3$ of green concrete can comprise 373 kg of the Portland cement, 133 kg of the natural basaltic volcanic ash pozzolan, 27 kg of the colloidal nano-sized silica particles; 693 kg of the fine aggregates, 1039 kg of the coarse aggregates; 160 kg of the water, and 6.7 kg of the super plasticizer. In this regard, the green concrete can have a compressive strength of about 70.0 MPa, about 87.4 MPa, about 104.6 MPa, and about 105.8 MPa after aging for about 7 days, about 28 days, about 91 days, and about 365 days, respectively. Similarly, the green concrete can have a rapid chloride penetration of about 278 Coulombs and about 96 Coulombs after aging for about 91 days and about 365 days, respectively. Likewise, the green concrete can have a water absorption of about 2.38% and about 2.02% after aging for about 91 days and about 365 days, respectively. Additionally, the green concrete can have an autogenous shrinkage of about 484 microns after curing for about 28 days. Furthermore, the green concrete has a drying shrinkage of about 342 microns after curing for about 97 days.

In an additional embodiment, each 1 m³ of green concrete can comprise 320 kg of the Portland cement, 176 kg of the natural basaltic volcanic ash pozzolan, 37 kg of the colloidal nano-sized silica particles; 693 kg of the fine aggregates, 1039 kg of the coarse aggregates; 160 kg of the water, and 7.5 kg of the super plasticizer. In this regard, the green concrete can have a compressive strength of about 68.6 MPa, about 84.0 MPa, about 101.6 MPa, and about 100.9 MPa after aging for about 7 days, about 28 days, about 91 days, and about 365 days, respectively. Similarly, the green concrete can have a rapid chloride penetration of about 198 Coulombs and about 90 Coulombs after aging for about 91 days and about 365 days, respectively. Likewise, the green concrete can have a water absorption of about 2.31% and about 1.92% after aging for about 91 days and about 365 days, respectively. Additionally, the green concrete can have an autogenous shrinkage of about 606 microns after curing for about 28 days. Furthermore, the green concrete can have a drying shrinkage of about 384 microns after curing for about 97 days.

In another embodiment, each 1 m³ of green concrete can comprise 227 kg of the Portland cement, 213 kg of the natural basaltic volcanic ash pozzolan, 53 kg of the colloidal nano-sized silica particles; 693 kg of the fine aggregates, 1039 kg of the coarse aggregates; 160 kg of the water, and 8 kg of the super plasticizer. In this regard, the green concrete can have a compressive strength of about 59.3 MPa, about 75.4 MPa, about 90.8 MPa, and about 97.3 MPa after aging for about 7 days, about 28 days, about 91 days, and about 365 days, respectively. Similarly, the green concrete can have a rapid chloride penetration of about 287 Coulombs and about 64 Coulombs after aging for about 91 days and about 365 days, respectively. Likewise, the green concrete can have a water absorption of about 2.50% and about 2.12% after aging for about 91 days and about 365 days, respectively. Additionally, the green concrete can have an autogenous shrinkage of about 666 microns after curing for about 28 days. Furthermore, the green concrete can have a drying shrinkage of about 413 microns after curing for about 97 days.

In a further embodiment, the fine aggregates can include dune silica sand, the coarse aggregates can include crushed limestone, and the super plasticizer can include polycarboxylate ethers.

In an embodiment, the colloidal nano-sized silica particles can have a density of about 1.4 g/cm³, a pH of about 9.5, a viscosity of about 8 cP, about 50% by weight of silica, a diameter of about 35 nm to about 75 nm, and a specific surface area of about 80 m²/g.

In an embodiment, the natural basaltic volcanic ash pozzolan and the colloidal nano-sized silica particles can have a Chappelle activity (mg Ca (OH)₂/g sample) of about 821.48 and about 1402.5, respectively.

In an embodiment, the Portland cement and the natural basaltic volcanic ash pozzolan can have a BET surface area of about 0.374 m²/g and about 0.356 m²/g, respectively.

In an embodiment, the green concrete can be prepared by immersing the demolded compacted first homogeneous mixture layers in water to cure the compacted first homogeneous mixture layers at about 20° C.

In an embodiment, the mixing can be conducted in a concrete mixer comprising a pan type concrete mixer with a mixing capacity of about 40 L to about 50 L.

In embodiment, the homogeneous solution can be prepared by adding the colloidal nano-sized silica particles to the water at a ratio of about 50% of the colloidal nano-sized silica particles to about 50% of the water, by weight.

In another embodiment, the trapped air can be released by rodding each of the layers of the first homogenous mixture in the respective molds.

In another embodiment, the stored compacted first homogeneous mixture layers can be demolded from the respective molds about 24 hours after the casting step.

In a further embodiment, the method can further include providing two prism-shaped steel shrinkage molds; pouring the second homogeneous mixture into a cavity of each of the two prism-shaped steel shrinkage molds; sealing a top surface of each of the two prism-shaped steel shrinkage molds; storing and curing each of the poured second homogeneous mixtures in each of the prism-shaped steel shrinkage molds to obtain prism-shaped autogenous shrinkage green concretes; demolding one of the cured autogenous shrinkage green concretes; drying the demolded cured autogenous shrinkage green concrete; and curing the dried autogenous shrinkage green concrete at about 20° C. and about 60% relative humidity.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
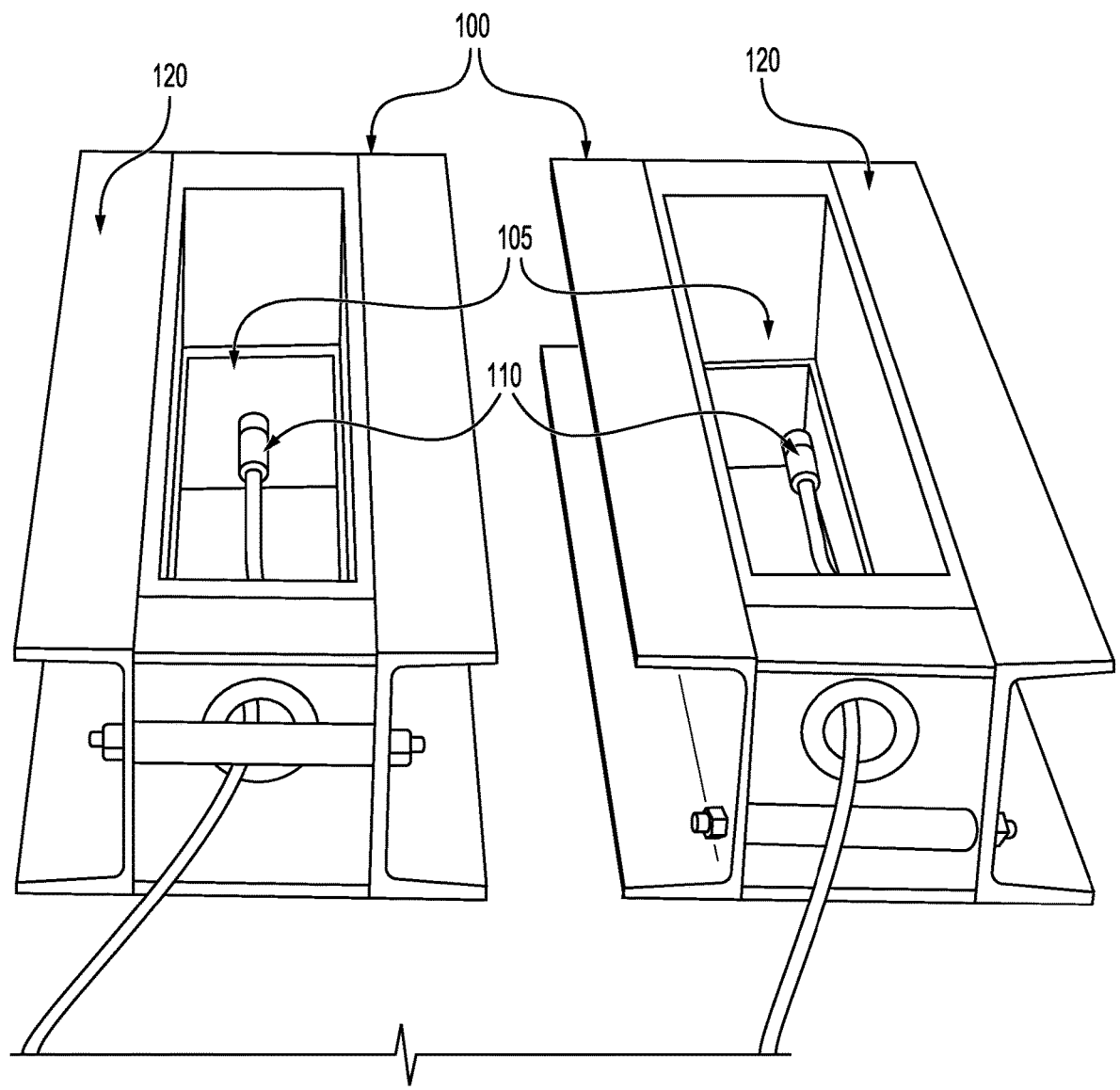
FIG. 1 depicts two prism-shaped steel shrinkage molds, each having a cavity therein and a top surface.

The following definitions are provided for the purpose of understanding the present subject matter and for construing the appended patent claims. The definitions are not meant to be limiting to the subject matter described herein.

Definitions

Throughout the application, where systems are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a system or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of producing green concrete with Portland cement (C), natural basaltic volcanic ash pozzolan (VA), and colloidal nano-sized silica particles (CNS) to improve compressive strength and durability performance after aging.

In this regard, the present subject matter further relates to a green concrete composition comprising: a binder component comprising Portland cement (C), natural basaltic volcanic ash pozzolan (VA), and colloidal nano-sized silica particles (CNS); an aggregate component comprising fine aggregates and coarse aggregates; water; and a super plasticizer.

In one embodiment, the method of producing green concrete includes homogenously dispersing colloidal nano-sized silica particles (CNS) in water (W) via sonication to obtain a homogenous solution; obtaining a blended mixture of Portland cement (C), natural basaltic volcanic ash pozzolan (VA), and water (W); continuously mixing the blended mixture while adding the homogeneous solution to the blended mixture to obtain a blended mixture solution; continue mixing the blended mixture solution for about five minutes to obtain a homogeneous mixture; dividing the homogeneous mixture to obtain a first homogenous mixture and a second homogenous mixture; providing two molds; casting a layer of the first homogenous mixture in each of the two molds; releasing trapped air from each of the layers of the first homogenous mixture in the respective molds; compacting each of the layers of the first homogenous mixture using the respective molds to obtain compacted first homogeneous mixture layers; storing the compacted first homogeneous mixture layers in the respective molds for a duration of time; demolding the stored compacted first homogeneous mixture layers from the respective molds; and curing the demolded compacted first homogeneous mixture layers to obtain green concrete.

In a further embodiment, the present subject matter relates to green concrete prepared by the above method.

In an embodiment, the method can include adding the colloidal nano-sized silica particles and the water to a sonicator at a ratio of about 50% of the colloidal nano-sized silica particles to about 50% of the water, by weight. Then the sonicator can be turned on to homogenously disperse the colloidal nano-sized silica particles in the water to obtain a homogenous solution.

In an embodiment, a cement mixture of the Portland cement, the natural basaltic volcanic ash pozzolan, the metakaolin, and the water can be added to a pan type concrete mixer with a mixing capacity of about 40 L to about 50 L. In an embodiment, the cement mixture can include about 0.5% to about 0.7% of the Portland cement, about 0.25% to about 0.40% of the natural basaltic volcanic ash pozzolan, about 0.05% to about 0.10% of the colloidal nano-sized silica particles, and about 0.30% of the water, by weight. In an embodiment, the cement mixture can include about 0.70% of the Portland cement, about 0.25% of the natural basaltic volcanic ash pozzolan, and about 0.05% of the colloidal nano-sized silica particles, by weight. In an embodiment, the cement mixture can include about 0.60% of the Portland cement, about 0.33% of the natural basaltic volcanic ash pozzolan, and about 0.07% of the colloidal nano-sized silica particles, by weight. In an embodiment, the colloidal nano-sized silica particles can have a density of about 1.4 g/cm$^3$, a pH of about 9.5, a viscosity of about 8 cP, about 50% by weight of silica, a diameter of about 35 nm to about 75 nm, and a specific surface area of about 80 m$^2$/g. In an embodiment, the cement mixture can further include fine aggregates (dune silica sand), coarse aggregates (crushed limestone), and a super plasticizer (polycarboxylate ethers).

The cement mixture can be mixed for about three minutes or more to obtain a blended mixture. The blended mixture can be continuously mixed while the homogeneous solution can be added to the blended mixture to obtain a blended mixture solution. The mixing can be stopped for about three minutes. Afterward, mixing of the blended mixture solution can be continued for about five minutes to obtain a homogenous mixture. In an embodiment, the homogenous mixture can be divided to obtain a first homogenous mixture and a second homogenous mixture.

In an embodiment, two molds can be provided. A layer of the first homogenous mixture can be casted into each of the two molds. Afterward, each of the layers of first the homogenous mixture in the respective molds can be rodded to release trapped air from each of the layers of the first homogenous mixture. Thereafter, each of the layers of the first homogenous mixture can be compacted using the respective molds to obtain compacted first homogeneous mixture layers.

In an embodiment, the compacted first homogeneous mixture layers in the respective molds can be stored in a laboratory for a duration of time.

In an embodiment, about 24 hours after the casting step, the stored compacted first homogeneous mixture layers can be demolded from the respective molds. Afterward, the demolded compacted first homogeneous mixture layers can be immersed in water to cure the compacted first homogeneous mixture layers at about 20° C. to obtain green concrete.

In an embodiment, the green concrete can have a compressive strength of about 70.0 MPa, about 87.4 MPa, about 104.6 MPa, and about 105.8 MPa after aging for about 7 days, about 28 days, about 91 days, and about 365 days, respectively. In an embodiment, the green concrete can have a compressive strength of about 68.6 MPa, about 84.0 MPa, about 101.6 MPa, and about 100.9 MPa after aging for about 7 days, about 28 days, about 91 days, and about 365 days, respectively.

In an embodiment, the green concrete can have a rapid chloride penetration of about 278 Coulombs and about 96 Coulombs after aging for about 91 days and about 365 days, respectively. In an embodiment, the green concrete can have a rapid chloride penetration of about 198 Coulombs and about 90 Coulombs after aging for about 91 days and about 365 days, respectively.

In an embodiment, the green concrete can have a water absorption of about 2.38% and about 2.02% after aging for about 91 days and about 365 days, respectively. In an embodiment, the green concrete can have a water absorption of about 2.31% and about 1.92% after aging for about 91 days and about 365 days, respectively.

In an embodiment, the green concrete can have an autogenous shrinkage of about 484 microns after curing for about 28 days. In an embodiment, the green concrete can have an autogenous shrinkage of about 606 microns after curing for about 28 days.

In an embodiment, the green concrete can have a drying shrinkage of about 342 microns after curing for about 97 days. In an embodiment, the green concrete can have a drying shrinkage of about 384 microns after curing for about 97 days.

In an embodiment, the natural basaltic volcanic ash pozzolan and the colloidal nano-sized silica particles can have a Chappelle activity (mg $Ca(OH)_2$/g sample) of about 821.48 and about 1402.5, respectively.

In an embodiment, the Portland cement and the natural basaltic volcanic ash pozzolan can have a BET surface area of about 0.374 $m^2$/g and about 0.356 $m^2$/g, respectively.

In a further embodiment, the method can further include providing two prism-shaped steel shrinkage molds; pouring the second homogenous mixture into a cavity of each of the two prism-shaped steel shrinkage molds; sealing a top surface of each of the two prism-shaped steel shrinkage molds; storing and curing each of the poured second homogeneous mixtures in each of the prism-shaped steel shrinkage molds to obtain prism-shaped autogenous shrinkage green concretes; demolding one of the cured autogenous shrinkage green concretes; drying the demolded cured autogenous shrinkage green concrete; and curing the dried autogenous shrinkage green concrete at about 20° C. and about 60% relative humidity.

In this regard, the two prism-shaped steel shrinkage molds (100) are shown in FIG. 1. Two multilayer sheets (not shown) can also be provided. Each of the two multilayer sheets have a polytetrafluoroethylene sheet (PTFE) laminated on a polyester film. Each of the two multilayer sheets can be placed inside a cavity (105) of each of the respective shrinkage molds (100), wherein the polytetrafluoroethylene sheet side of each of the multilayer sheets faced the respective cavity (105) of the respective shrinkage molds (100). Afterward, an embedment strain gage (110) can be placed in the middle of the cavity (105) of each of the shrinkage molds (100). A thermocouple (not shown) can also be embedded into each of the shrinkage molds (100).

Figure 2:
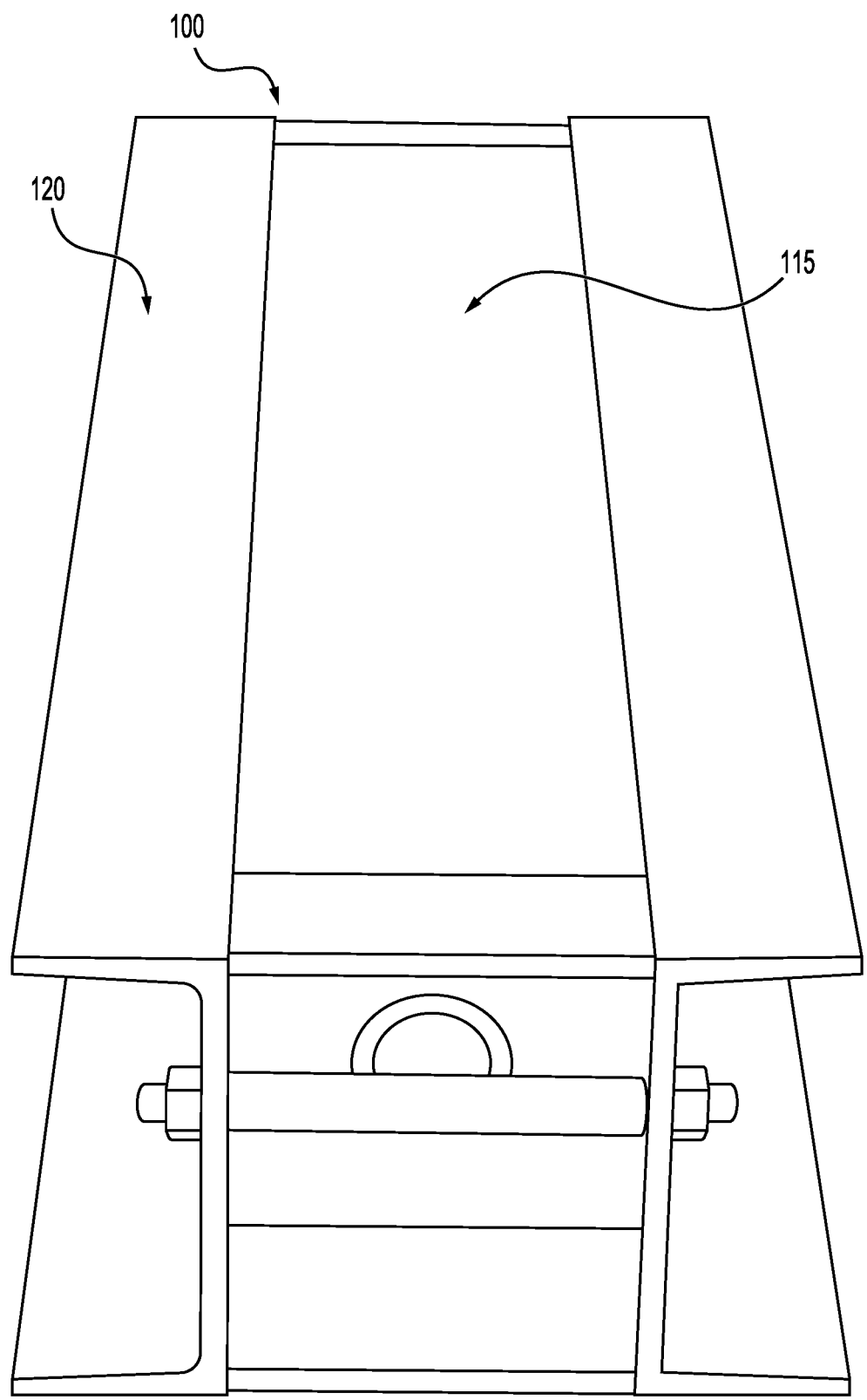
FIG. 2 depicts a poured second homogeneous mixture within one of the prism-shaped steel shrinkage molds.

Then, the second homogeneous mixture (115) can be poured into the cavity (105) of each of the shrinkage molds (100). Afterward, the top surface of the poured second homogeneous mixture (115) in each of the cavities (105) can be leveled as shown in FIG. 2.

Figure 3:
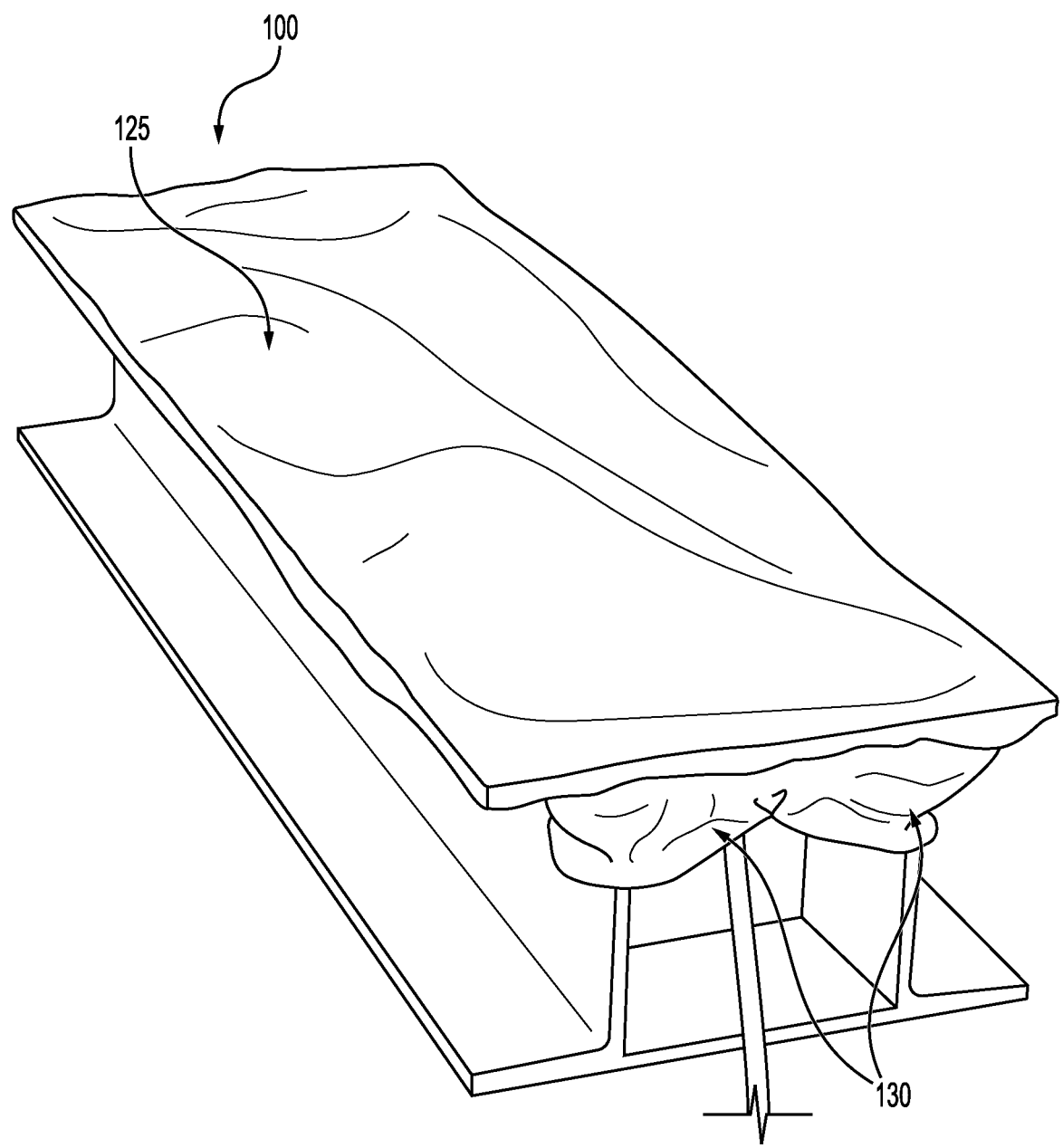
FIG. 3 depicts a top surface of one of the prism-shaped steel shrinkage molds being sealed.

Thereafter, the top surface (120) of each of the shrinkage molds (100) can be sealed with a polyester film (not shown) followed by an aluminum foil (125) and then an adhesive tape (130) as shown in FIG. 3.

Each of the sealed shrinkage molds (100) can be placed in an environmental chamber (not shown) for storing and curing under controlled temperature of about 20° C., about 95% humidity, and about 65% relative humidity to obtain prism-shaped autogenous shrinkage green concretes (not shown).

About 7 days after the sealed curing in the environmental chamber (not shown), one of the two autogenous shrinkage green concretes can be demolded from the respective shrinkage mold (100). Afterward, the demolded autogenous shrinkage green concrete can be dried.

The dried autogenous shrinkage green concrete can be moved to another environmental chamber (not shown) for curing under controlled temperature of about 20° C. and about 60% relative humidity.

The following examples illustrate the present teachings.

EXAMPLES

Example 1

Preparation of Green Concrete

The process of producing green concrete was conducted using the following steps.

Storage of cement mixture: Prior to usage, a cement mixture of Portland cement, natural basaltic volcanic ash pozzolan, colloidal nano-sized silica particles, fine aggregates (dune silica sand), coarse aggregates (crushed limestone), and super plasticizer (polycarboxylate ethers) were stored under a controlled laboratory environment at about 20° C. and about 60% humidity.

Preparation of homogenous solution: Colloidal nano-sized silica particles and water were added to a sonicator at a ratio of about 50% of the colloidal nano-sized silica particles to about 50% of the water, by weight. Then the sonicator was turned on to homogenously disperse the colloidal nano-sized silica particles in the water to obtain a homogenous solution.

Mixing of cement mixture: A cement mixture of Portland cement, natural basaltic volcanic ash pozzolan, water, fine aggregates (dune silica sand), coarse aggregates (crushed limestone), and super plasticizer (polycarboxylate ethers) was added to a pan type concrete mixer with a mixing capacity of about 40 L to about 50 L. The cement mixture was then mixed for about three minutes or more to obtain a blended mixture. The blended mixture was continuously mixed while the homogeneous solution was added to the blended mixture to obtain a blended mixture solution. The mixing was then stopped for about three minutes. Afterward, mixing of the blended mixture solution was continued for about five minutes to obtain a homogenous mixture. The mixing procedure was performed in a mixing room under the controlled laboratory environment at about 20° C. and about 60% humidity. The mixing was conducted according to ASTM C192 (ASTM C 192/C 192M-02, 2018) standard practice.

Dividing the homogeneous mixture: The homogeneous mixture was divided to obtain a first homogeneous mixture and a second homogeneous mixture.

Molding: Two molds were provided. A layer of the first homogenous mixture was casted into each of the two molds. Afterward, each of the layers of the first homogenous mixture in the respective molds was rodded to release trapped air from each of the layers of the first homogenous mixture. Thereafter, each of the layers of the first homogenous mixture was compacted using the respective molds to obtain compacted first homogeneous mixture layers.

Storage: The compacted first homogeneous mixture layers in the respective molds were stored in a laboratory for a duration of time.

Demolding and curing: About 24 hours after the casting step, the stored compacted first homogeneous mixture layers were demolded from the respective molds. Afterward, the demolded compacted first homogeneous mixture layers were immersed in water to cure the compacted first homogeneous mixture layers at about 20° C. to obtain green concrete.

The obtained green concrete was produced using one of the cement mixture proportions shown in Table 1 (about 70C-25VA-5CNS or about 60C-33VA-7CNS or about 50C-40VA-10CNS). The above process was repeated for the rest of the mentioned cement mixture proportions to produce a plurality of green concretes from three different concrete mixture proportions. For the purpose of aging, as described below, the above process was also repeated for all three cement mixture proportions to produce a plurality of concrete green concretes.

The concrete mix proportions as shown in Table 1 are based on the numbers of kilograms designed for 1 m³ of concrete. In this regard, the concrete as shown has four main components: a binder component, an aggregate component, water, and an admixture or super plasticizer.

In this regard, in Table 1, the total binder component required to produce 1 m³ of concrete is 533 kg. The total aggregate component required to produce 1 m³ of concrete is 1732 kg. The water component required to produce 1 m³ of concrete is 160 kg. The admixture or super plasticizer component required to produce 1 m³ of concrete is 6.7-8 kg.

Regarding Mix 1 (70C-25VA-5CNS) as shown in Table 1, the binder component required to produce 1 m³ of concrete contains 373 kg (70%) of the cement (C), 133 kg (25%) of the natural basaltic volcanic ash pozzolan (VA), and 27 kg (5%) of the colloidal nano-sized silica particles (CNS). The aggregate component required to produce 1 m³ of concrete contains 693 kg of the fine aggregates (FA) and 1039 kg of the coarse aggregates (CA). The water component required to produce 1 m³ of concrete is 160 kg. The admixture or super plasticizer component required to produce 1 m³ of concrete is 6.7 kg.

Regarding Mix 2 (60C-33VA-7CNS) as shown in Table 1, the binder component required to produce 1 m³ of concrete contains 320 kg (60%) of the cement (C), 176 kg (33%) of the natural basaltic volcanic ash pozzolan (VA), and 37 kg (7%) of the colloidal nano-sized silica particles (CNS). The aggregate component required to produce 1 m³ of concrete contains 693 kg of the fine aggregates (FA) and 1039 kg of the coarse aggregates (CA). The water component required to produce 1 m³ of concrete is 160 kg. The admixture or super plasticizer component required to produce 1 m³ of concrete is 7.5 kg.

Regarding Mix 3 (50C-40VA-10CNS) as shown in Table 1, the binder component required to produce 1 m³ of concrete contains 267 kg (50%) of the cement (C), 213 kg (40%) of the natural basaltic volcanic ash pozzolan (VA), and 53 kg (10%) of the colloidal nano-sized silica particles (CNS). The aggregate component required to produce 1 m³ of concrete contains 693 kg of the fine aggregates (FA) and 1039 kg of the coarse aggregates (CA). The water component required to produce 1 m³ of concrete is 160 kg. The admixture or super plasticizer component required to produce 1 m³ of concrete is 8 kg.

| | Proportions by weights (%) | | | | | | |
|---|---|---|---|---|---|---|---|
| | Binder | | | Aggregates | | Water | Super Plasticizer |
| Mix ID | C | VA | NS | FA | CA | W | SP |
| 100C | 1 | — | — | 1.30 | 1.95 | 0.30 | 0.90 |
| 70C-25VA-5NS | 0.7 | 0.25 | 0.05 | 1.30 | 1.95 | 0.30 | 1.25 |
| 60C-33VA-7NS | 0.6 | 0.33 | 0.07 | 1.30 | 1.95 | 0.30 | 1.40 |
| 50C-40VA-10NS | 0.5 | 0.40 | 0.10 | 1.30 | 1.95 | 0.30 | 1.50 |

| | Proportions by weights (kg/m³ of concrete) | | | | | | |
|---|---|---|---|---|---|---|---|
| | Binder | | | Aggregates | | Water | Super Plasticizer |
| Mix ID | C | VA | NS | FA | CA | W | SP |
| 100C | 533 | — | — | 693 | 1039 | 160 | 4.8 |
| 70C-25VA-5NS | 373 | 133 | 27 | 693 | 1039 | 160 | 6.7 |
| 60C-33VA-7NS | 320 | 176 | 37 | 693 | 1039 | 160 | 7.5 |
| 50C-40VA-10NS | 267 | 213 | 53 | 693 | 1039 | 160 | 8.0 |

The chemical compositions of the Portland cement, the natural basaltic volcanic ash pozzolan, and the colloidal nano-sized silica particles are shown in Table 2. The BET surface area and the particle size distribution of the Portland cement, the natural basaltic volcanic ash pozzolan, and the colloidal nano-sized silica particles are shown in Table 3. The physical properties of the colloidal nano-sized silica particles are shown in Table 4.

TABLE 2

Chemical compositions of Portland cement (C), volcanic ash (VA), and colloidal nano-sized silica particles (CNS)

| | Chemical composition (oxides, % by weight) | | |
|---|---|---|---|
| | C | VA | CNS |
| $SiO_2$ | 21.6 | 48.97 | 99.9 |
| $Al_2O_3$ | 5.56 | 16.06 | — |
| $Fe_2O_3$ | 3.48 | 10.91 | — |
| $SiO_2 + Al_2O_3 + Fe_2O_3$ | — | 75.94 | 99.9 |
| CaO | 63.3 | 9.11 | — |
| MgO | 0.73 | 7.91 | — |
| $Na_2O$ | 0.15 | 4.28 | — |
| $K_2O$ | 0.52 | 0.71 | — |
| $SO_3$ | 2.35 | 0.01 | — |
| Cl | — | 0.03 | — |
| LOI | 2.31 | 1.91 | — |

TABLE 3

BET surface area and particle size distribution of the materials

| Binder type | BET surface area ($m^2/g$) | Diameter for Selected percentiles by volume | | |
|---|---|---|---|---|
| | | $D_{10}$ (um)** | $D_{50}$ (um)** | $D_{90}$ (um)** |
| C | 0.374 | 0.78 | 9.24 | 20.13 |
| VA | 0.356 | 3.44 | 12.21 | 28.33 |
| CNS | 80.0* | — | — | — |

*Surface area of CNS was measured by titration method.
**$D_{10}$, $D_{50}$ and $D_{90}$ represent the particle sizes of 10%, 50% and 90% of the materials sample.

TABLE 4

Physical properties of colloidal nano-sized silica (CNS)

| ID | Purity (%) | Density (g/cm³) | pH | Viscosity (cP) | Silica (%) by weight | Diameter (nm) | Specific surface area (m²/g) |
|---|---|---|---|---|---|---|---|
| CNS | 99.9 | 1.4 | 9.5 | 8 | 50* | 35-75 | 80 |

*CNS includes 50% $SiO_2$ and 50% water.

Example 2

Preparation of Portland Cement-Based Concrete (Control)

The process of producing Portland cement-based concrete was conducted using the following steps.

Mixing of Portland cement: A cement mixture of Portland cement, water, fine aggregate (dune silica sand), coarse aggregate (crushed limestone), and super plasticizer (polycarboxylate ethers) was added to a pan type concrete mixer with a mixing capacity of about 40 L to about 50 L. The cement mixture was then mixed for about three minutes or more to obtain a blended mixture. The mixing was then stopped for about three minutes. Afterward, mixing of the blended mixture was continued for about five minutes to obtain a homogeneous mixture. The mixing was conducted according to ASTM C192 (ASTM C 192/C 192M-02, 2018) standard practice.

Molding: Two molds were provided. A layer of the homogenous mixture was casted into each of the two molds. Afterward, each of the layers of the homogenous mixture in the respective molds was rodded to release trapped air from each of the layers of the homogenous mixture. Thereafter, each of the layers of the homogenous mixture was compacted using the respective molds to obtain compacted homogeneous mixture layers.

Storage: The compacted homogeneous mixture layers in the respective molds were stored in a laboratory for a duration of time.

Demolding and curing: About 24 hours after the casting step, the stored compacted homogeneous mixture layers were demolded from the respective molds. Afterward, the demolded compacted homogeneous mixture layers were immersed in water to cure the compacted homogeneous mixture layers at about 20° C. to obtain Portland cement-based concrete.

The obtained Portland cement-based concrete was produced using the mixture proportion (C100) shown in Table 1. For the purpose of aging, as described below, the above process was repeated several times using the same mixture proportion (C100) to produce a plurality of Portland cement-based concretes. These concretes were used as a control.

Example 3

Compressive Strength After Ageing

The obtained plurality of green concretes and Portland cement-based concretes produced by the methods described above were individually aged. During the aging process, one of each of the plurality of green concretes and Portland cement-based concretes were aged at about 7 days. The same procedure was conducted for aging at about 28 days, about 91 days, and about 365 days. All of the aged green concretes and Portland cement-based concretes were then used for compressive strength testing.

As shown in Table 5, the green concretes with cement mixture proportion containing about 70C-25VA-5CNS provided higher overall compressive strengths for all the aging days relative to the Portland cement-based concretes. These data indicate that partially substituting Portland cement with supplementary cementitious materials (SCM) such as natural basaltic volcanic ash pozzolan and the colloidal nano-sized silica particles in a cement mixture provide a higher compressive strength relative to a cement mixture having about 100% by weight of the Porland cement. For the green concretes with cement mixture proportion containing about 60C-33VA-7CNS, the overall compressive strengths for all the aging days where higher relative to the Portland cement-based concretes except for about 365 aging days. For green concretes containing cement mixture proportion of about 50C-40VA-10CNS, the compressive strengths were lower for all of the aging days relative to the Portland cement-based concretes.

TABLE 5

Average compressive strength at about 7 days, about 28 days, about 91 days, and about 365 days aging

| | Compressive Strength (MPa) | | | |
|---|---|---|---|---|
| Mixes ID | 7 days | 28 days | 91 days | 365 days |
| C100 | 62 | 78.3 | 98.5 | 102 |
| 70C-25VA-5CNS | 70.0 | 87.4 | 104.6 | 105.8 |

TABLE 5-continued

Average compressive strength at about 7 days, about
28 days, about 91 days, and about 365 days aging

| | Compressive Strength (MPa) | | | |
|---|---|---|---|---|
| Mixes ID | 7 days | 28 days | 91 days | 365 days |
| 60C-33VA-7CNS | 68.6 | 84.0 | 101.6 | 100.9 |
| 50C-40VA-10CNS | 59.3 | 75.4 | 90.8 | 97.3 |

Note:
About 24 hours after the casting step, concrete specimens were demolded and moist cured under standard laboratory conditions at about 20° C. Afterward, the cured concrete specimens were aged for about 7 days, about 28 days, about 91 days, and about 365 days.

Example 4

Rapid Chloride Penetration and Water Absorption After Ageing

The obtained plurality of green concretes and Portland cement-based concretes produced by the methods described above were individually aged. During the aging process, one of each of the plurality of green concretes and Portland cement-based concretes were aged at about 91 days. The same procedure was conducted for aging at about 365 days. All of the aged green concretes and Portland cement-based concretes were then used for rapid chloride penetration testing and water absorption testing.

As shown in Table 6, the green concretes with cement mixture proportions containing about 70C-25VA-5CNS, about 60C-33VA-7CNS, and about 50C-40VA-10CNS exhibited lower overall rapid chloride penetration and water absorption values for all the aging days relative to the Portland cement-based concretes. These data show that partially substituting Portland cement with supplementary cementitious materials (SCM) such as natural basaltic volcanic ash pozzolan and the colloidal nano-sized silica particles in a cement mixture provide lower rapid chloride penetration and water absorption values relative to a cement mixture having about 100% by weight of the Porland cement. The lower rapid chloride penetration and water absorption values resulted in improved durability performance of the green concretes.

TABLE 6

Rapid chloride penetration and water absorption of different concretes

| | Rapid Chloride Penetration Test (Coulombs) | | Water Absorption (%) | |
|---|---|---|---|---|
| Mixes ID | 91 days | 365 days | 91 days | 365 days |
| C100 | 1038 | 409 | 3.20 | 2.81 |
| 70C-25VA-5CNS | 278 | 96 | 2.38 | 2.02 |
| 60C-33VA-7CNS | 198 | 90 | 2.31 | 1.92 |
| 50C-40VA-10CNS | 287 | 64 | 2.50 | 2.12 |

Note:
About 24 hours after the casting step, concrete specimens were demolded and moist cured under standard laboratory conditions at about 20° C. Afterward, the cured concrete specimens were aged for about 91 days and about 365 days. Rapid chloride penetration test (RCPT) of the concrete specimens were conducted according to ASTM C1202 specifications (ASTM C1202, 2012). The water absorption of the concrete specimens were measured in accordance with ASTM C948 (2016), 2016).

Example 5

Chappelle Reactivity Analysis

A Chappelle reactivity test was conducted for the natural basaltic volcanic ash pozzolan (VA) and the colloidal nano-sized silica particles (CNS) to evaluate the reactivity of the mentioned materials. Data from the test is shown in Table 7. The Chappelle reactivity test is used as an indicator of how much of the calcium oxide (CaO) is utilized by the mentioned materials. A higher value means more calcium oxide consumption. As can be seen from the test results shown in Table 7, the colloidal nano-sized silica particles sample demonstrated the highest reactivity.

TABLE 7

Chappelle reactivity analysis of VA and CNS

| Materials IDs | Chappelle activity (mg Ca $(OH)_2$/ g sample) |
|---|---|
| VA | 821.48 |
| CNS | 1402.5 |

Example 6

Preparation of Green Concretes for Autogenous Shrinkage and Drying Shrinkage

The process of producing autogenous shrinkage green concretes was conducted using the following steps.

Preparation of molds: Two prism-shaped steel shrinkage molds were provided. Two multilayer sheets were also provided. Each of the two multilayer sheets have a polytetrafluoroethylene sheet (PTFE) laminated on a polyester film. Each of the two multilayer sheets were placed inside a cavity of each of the respective shrinkage molds, wherein the polytetrafluoroethylene sheet side of each of the multilayer sheets faced the respective cavity of the respective shrinkage molds. Afterward, an embedment strain gage was placed in the middle of the cavity of each of the shrinkage molds to measure axial strain of the green concrete in each of the cavities. A thermocouple was also embedded into each of the shrinkage molds to record temperature changes within the green concrete of each of the shrinkage molds.

Pouring of the concrete mixture into the molds: The second homogeneous mixture (see Example 1) was poured into the cavity of each of the two shrinkage molds. Afterward, the top surface of the poured second homogeneous mixture in each of the cavities were leveled.

Covering of the molds: The top surface of each of the shrinkage molds were sealed with a polyester film followed by an aluminum foil and then an adhesive tape to ensure no moisture transport from the top surface of each of the second homogeneous mixture within the respective cavities of the respective shrinkage molds as shown.

Storage and curing: Each of the sealed shrinkage molds were placed in an environmental chamber for storing and curing under controlled temperature of about 20° C., about 95% humidity, and about 65% relative humidity to obtain prism-shaped autogenous shrinkage green concretes. Each of the prism-shaped autogenous shrinkage green concretes have a dimension of about 100 mm in width×about 100 mm in height×about 400 mm in length.

Demolding and drying: About 7 days after the sealed curing in the environmental chamber, one of the two autogenous shrinkage green concretes was demolded from the respective shrinkage mold. The demolded autogenous shrinkage green concrete was dried.

Curing: The dried autogenous shrinkage green concrete was moved to another environmental chamber for curing under controlled temperature of about 20° C. and about 60% relative humidity.

The obtained autogenous shrinkage green concretes were produced using one of the cement mixture proportions shown in Table 1 (about 70C-25VA-5CNS or about 60C-33VA-7CNS or about 50C-40VA-10CNS). The above process was repeated for the rest of the mentioned cement mixture proportions to produce a plurality of autogenous shrinkage green concretes from three different concrete mixture proportions.

All the data related to autogenous shrinkage strain, drying shrinkage strain, and concrete temperate were automatically logged by using a TDS-530 data logger. The monitoring of autogenous shrinkage and drying shrinkage data were continued up to about 28 days and about 97 days, respectively as show in Table 8.

TABLE 8

Ultimate autogenous shrinkage and drying shrinkage at about 28 days and about 97 days respectively

| Mixes ID | Autogenous shrinkage (microns) 28 days | Drying shrinkage (microns)* 97 days |
|---|---|---|
| 100C | 700 | 447 |
| 70C-25VA-5CNS | 484 | 342 |
| 60C-33VA-7CNS | 606 | 384 |
| 50C-40VA-10CNS | 666 | 413 |

*After about 7 days of continuous sealed curing in an environmental chamber at about 20° C. and about 60% relative humidity, one of the two identical shrinkage specimens was demolded from one of the shrinkage molds and exposed to drying. The demolded specimen was moved to another environmental chamber for curing under controlled temperature at about 20° C. and about 60% relative humidity. All the data related to autogenous shrinkage strain, drying shrinkage strain, and concrete temperature were logged automatically by using a TDS-530 data logger. The monitoring of the autogenous shrinkage strain and drying shrinkage strain data were continued up to 28 days and 97 days, respectively.

It is to be understood that the green concrete and the method of producing the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A green concrete comprising:
   a binder component comprising Portland cement (C), natural basaltic volcanic ash pozzolan (VA), and colloidal nano-sized silica particles (CNS);
   an aggregate component comprising fine aggregates (FA) and coarse aggregates (CA);
   water (W); and
   a super plasticizer;
   wherein each 1 m$^3$ of green concrete comprises 533 kg of the binder component, 1732 kg of the aggregate component, 160 kg of the water, and 6.7-7.5 kg of the super plasticizer.

2. The green concrete of claim 1, wherein each 1 m$^3$ of green concrete comprises 373 kg of the Portland cement, 133 kg of the natural basaltic volcanic ash pozzolan, 27 kg of the colloidal nano-sized silica particles; 693 kg of the fine aggregates, 1039 kg of the coarse aggregates; 160 kg of the water, and 6.7 kg of the super plasticizer.

3. The green concrete of claim 1, wherein each 1 m$^3$ of green concrete comprises 320 kg of the Portland cement, 176 kg of the natural basaltic volcanic ash pozzolan, 37 kg of the colloidal nano-sized silica particles; 693 kg of the fine aggregates, 1039 kg of the coarse aggregates; 160 kg of the water, and 7.5 kg of the super plasticizer.

4. The green concrete of claim 1, wherein each 1 m$^3$ of green concrete comprises 267 kg of the Portland cement, 213 kg of the natural basaltic volcanic ash pozzolan, 53 kg of the colloidal nano-sized silica particles; 693 kg of the fine aggregates, 1039 kg of the coarse aggregates; 160 kg of the water, and 8.0 kg of the super plasticizer.

5. The green concrete of claim 2, wherein the green concrete has a compressive strength of about 70.0 MPa, about 87.4 MPa, about 104.6 MPa, and about 105.8 MPa after aging for about 7 days, about 28 days, about 91 days, and about 365 days, respectively.

6. The green concrete of claim 2, wherein the green concrete has a rapid chloride penetration of about 278 Coulombs and about 96 Coulombs after aging for about 91 days and about 365 days, respectively, and a water absorption of about 2.38% and about 2.02% after aging for about 91 days and about 365 days, respectively.

7. The green concrete of claim 2, wherein the green concrete has an autogenous shrinkage of about 484 microns after curing for about 28 days.

8. The green concrete of claim 2, wherein the green concrete has a drying shrinkage of about 342 microns after curing for about 97 days.

9. The green concrete of claim 3, wherein the green concrete has a compressive strength of about 68.6 MPa, about 84.0 MPa, about 101.6 MPa, and about 100.9 MPa after aging for about 7 days, about 28 days, about 91 days, and about 365 days, respectively.

10. The green concrete of claim 3, wherein the green concrete has a rapid chloride penetration of about 198 Coulombs and about 90 Coulombs after aging for about 91 days and about 365 days, respectively, and a water absorption of about 2.31% and about 1.92% after aging for about 91 days and about 365 days, respectively.

11. The green concrete of claim 3, wherein the green concrete has an autogenous shrinkage of about 606 microns after curing for about 28 days.

12. The green concrete of claim 3, wherein the green concrete has a drying shrinkage of about 384 microns after curing for about 97 days.

13. The green concrete of claim 4, wherein the green concrete has a compressive strength of about 59.3 MPa, about 75.4 MPa, about 90.8 MPa, and about 97.3 MPa after aging for about 7 days, about 28 days, about 91 days, and about 365 days, respectively.

14. The green concrete of claim 4, wherein the green concrete has a rapid chloride penetration of about 287 Coulombs and about 64 Coulombs after aging for about 91 days and about 365 days, respectively, and a water absorption of about 2.50% and about 2.12% after aging for about 91 days and about 365 days, respectively.

15. The green concrete of claim 4, wherein the green concrete has an autogenous shrinkage of about 666 microns after curing for about 28 days and a drying shrinkage of about 413 microns after curing for about 97 days.

16. The green concrete of claim 1, wherein the fine aggregates comprise dune silica sand, the coarse aggregates comprise crushed limestone, and the super plasticizer comprise polycarboxylate ethers.

17. The green concrete of claim 1, wherein the colloidal nano-sized silica particles have a density of about 1.4 g/cm$^3$, a pH of about 9.5, a viscosity of about 8 cP, about 50% by weight of silica, a diameter of about 35 nm to about 75 nm, and a specific surface area of about 80 m$^2$/g.

18. The green concrete of claim 1, wherein the natural basaltic volcanic ash pozzolan and the colloidal nano-sized silica particles have a Chappelle activity (mg Ca $(OH)_2$/g sample) of about 821.48 and about 1402.5, respectively.

19. The green concrete of claim 1, wherein the Portland cement and the natural basaltic volcanic ash pozzolan have a BET surface area of about 0.374 $m^2$/g and about 0.356 $m^2$/g, respectively.

* * * * *